Oct. 5, 1965     LE ROY J. HYMAN     3,209,517
PROTECTIVE LEG SUPPORT FOR HORSES
Filed April 28, 1965
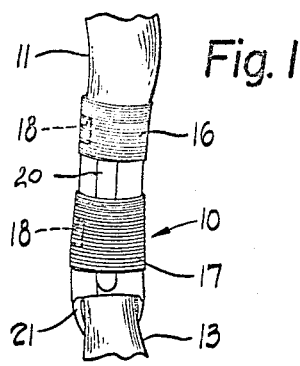
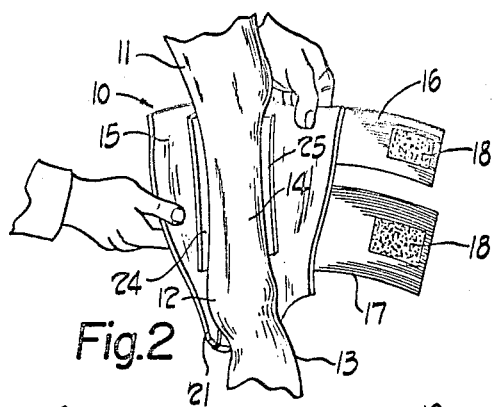
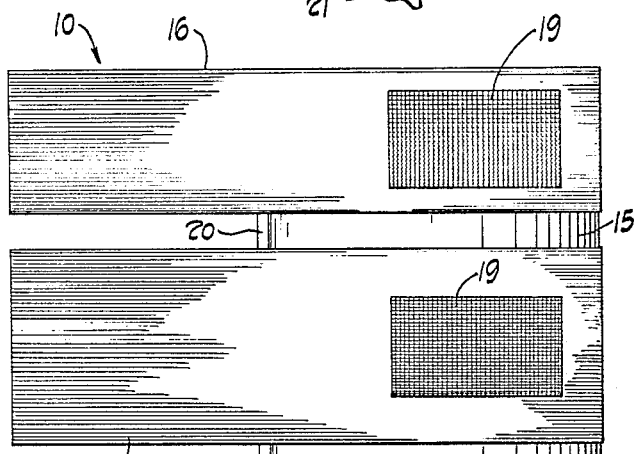
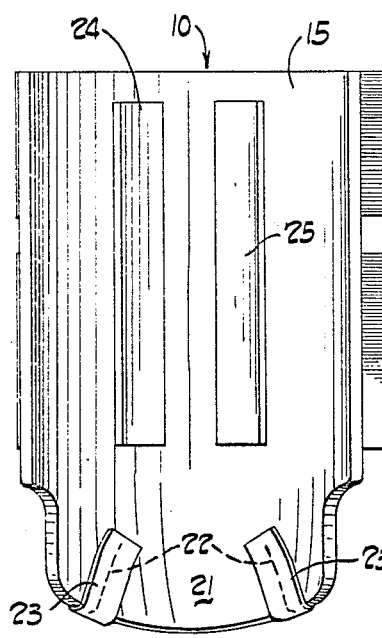
INVENTOR.
LEROY J. HYMAN
BY *Sanford Schumacher*
ATTORNEY.

United States Patent Office 3,209,517
Patented Oct. 5, 1965

3,209,517
PROTECTIVE LEG SUPPORT FOR HORSES
Le Roy J. Hyman, Del-Jay Farm, Chagrin River Road,
Gates Mills, Ohio
Filed Apr. 28, 1965, Ser. No. 451,464
4 Claims. (Cl. 54—82)

This invention relates to new and useful improvements in protective coverings and supports for the legs of animals and particularly to a protective leg support for horses.

Heretofore, it has been the common practice to construct protectors for the limbs of horses from leather, and to secure them in position by means of straps and buckles.

Such devices have proven, however, to be difficult to maintain in support and protection to the limb upon which they are positioned, which is due, mainly, to the stiffness of the leather, particularly after it has been subjected to use.

Furthermore, such devices do not afford the proper protection without the provision of pads of relatively soft material which have to be sewed or otherwise fastened to the protector.

It is an object of the present invention to provide a new and novel protecting device and support for the limbs of horses and similar animals which have inherent tendencies to stay in the proper adjusted position in which it is placed.

A further object of the invention resides in the provision of a resilient material, preferably a sealed cell polymeric composition, for the purpose of making such a protective device, which affords highly effective cushioning without interfering with the free and easy movement of the legs of an animal by which it is worn.

Another object is to provide such a protective leg support that will not absorb moisture or sweat, is easy to keep clean, can be maintained in a sanitary condition by the use of ordinary soap and water, with no consequent stiffening after repeated washing and drying.

Still other objects are to provide a protective leg support, of the type stated, that is extremely light in weight, conforms to the shape of irregularities in the leg, and is easy to apply and remove without employing buckles, metal zipper, or clamps of any kind.

These and other objects of the invention will become apparent from a reading of the following specification and claims, together with the accompanying drawing, wherein like parts are referred to and indicated by like reference numerals, and wherein:

FIGURE 1 is a perspective view of the fore leg of a horse showing the protective leg support that is the subject of this invention positioned thereon;

FIGURE 2 is a perspective view of the device, showing it being fitted to the posterior side of the fore leg;

FIGURE 3 is an inside view of the protective leg support in its spread-out, fully open condition; and, FIGURE 4 is an outside view of the protective leg support illustrated in FIGURE 3.

Referring more particularly to the drawing, there is seen in FIGURE 1 the protective leg support, that is the subject of this invention, broadly indicated by reference numeral 10, as it appears mounted on the fore-leg 11 of a horse for support and protection of the cannon bone area, with a lower cap portion 21 affording protection to the fetlock and posterior pastern area.

The protective leg support 10 is fabricated from a single sheet of a sealed-cell polymeric composition, preferably 7/32″ thick, which provides a supportive sheath that will absorb and cushion all blows against the surface thereof.

The sheet is cut to provide a substantially rectangular body band 15, of a length and width to cover the cannon bone area in overlapping, encircling, engagement.

Reference numeral 21 indicates an extension of the body band 15, formed integral therewith, as seen most clearly in FIGURES 3 and 4. This area is contoured to provide a cap portion 21 which fits over the fetlock and pastern area, as explained hereinafter.

The contouring of the cap 21 is effected by making two spaced V notches at the lower edge of the cap, drawing their cut edges 22 together and holding them in opposed engagement through adhesive strips 23 which cover the abutting edges 22 on both the inner and outer faces of the cap.

Two spaced and parallel locating ribs 24 and 25, made of the same material and thicknes as the body band 15 are mounted centrally of the band on the inner face thereof. The ribs extend vertically of the band 15 from a point immediately above the cap portion 21, and are spaced apart to receive the long tendon posterior or anterior of the cannon bone, therebetween, depending upon which way the protective support 10 is applied to the leg, as described hereinafter.

Two parallel elastic straps 16 and 17 are glued to the outer surface of the band 15, cross-wise thereof, and extend beyond one edge of the band 15, as seen in FIGURE 4. The adhesive holds the straps immovable on the band 15, but free to expand or contract at their extending ends. Reference numeral 20 indicates a protective tape glued along the band edge to prevent fraying of the edge, when positioned in overlapping engagement with the opposite edge, when the band is in its leg encircling condition, as seen in FIGURE 1.

A length of woven nylon tape 19 is glued to the outer surface of each of the straps 16 and 17, proximate their anchored ends, as seen in FIGURE 4. The tape 19 forms one of the two strips of a fastener which is preferably of the type known as a "Velcro Fastener." A second length of similar tape 18 is glued to the inner face of the elastic straps 16 and 17, at the free ends thereof, as seen in FIGURE 3. Fasteners of this type are described in U.S. Patent No. 2,717,437, to which reference may be had for a complete understanding of their construction and use.

To mount the protective leg support 10 the following procedure is followed:

As seen in FIGURE 2, the body band 15 is held in a spread open condition and pressed against the posterior side of cannon bone area 14 of either the fore or rear leg 11. A fore-leg is illustrated in FIGURE 2. The two locating ribs 24 and 25 are fitted against the posterior long tendon of the cannon bone, to engage the long tendon therebetween, while at the same time the cap 21 is located at the fetlock and posterior pastern area 12.

The band is then made to encircle the leg 11 and overlap upon itself. The elastic straps are stretched to draw the band tight, and their end tapes 18 pressed firmly down against the second fastener tapes 19 to secure the ends of the straps in place.

In brief, the tape 18 is provided on its outer surface with raised pile threads, and the tape 19 is similarly provided on its outer surface with raised pile threads, so that when the tapes are pressed together, by mere finger pressure, the threads interlock with each other to cause removable securement of the tape 18 to the tape 19. This securement being such as to maintain the straps 16 and 17 and the body band 15, on which they are mounted, in firm supportive and protective encirclement of leg muscles at the cannon bone, under all normal conditions. At the same time the tapes 18 can be readily removed from the tapes 19 by merely pulling the ends of the straps 16 and 17 away from the tapes 19.

The so mounted body band 15 provides protective support for the leg 11, as seen in FIGURE 1, with the fetlock and posterior pastern area covered by the cap 21.

The so mounted protective support 10 is held against rotation on the leg by the two locating ribs 24 and 25 which bear against the sides of the long tendon posterior of the cannon bone.

This construction assures that the cap 21 will be properly maintained over the fetlock and posterior pastern area under the most extreme conditions of leg motion.

In the case of trotters and pacers, it is desirable to mount the protective support 10 on the anterior side of the leg with the long tendon anterior of the cannon bone positioned between the locating ribs 24 and 25. In this anterior placement of the protective leg support, the cap 21 fits snuggly over the fetlock and anterior pastern area as well as the coronet band, to give the additional protection needed with this type of horse.

It will now be clear that there has been provided a device which accomplishes the objectives heretofore set forth.

While the invention has been disclosed in its preferred form, it is to be understood that the specific embodiment thereof, as described and illustrated herein, is not to be considered in a limited sense, as there may be other forms or modifications of the invention which should also be construed to come within the scope of the appended claims.

I claim:

1. In a protective leg support for horses, a band of inherently cushioning material having interengaging means adapted to encircle the cannon bone, the length thereof, in overlapping engagement and be locked upon itself the lower portion of the band having an extension, formed integral therewith, contoured to define a cap portion shaped to fit snuggly over the fetlock and posterior pastern area; and, two spaced vertically extending parallel locating ribs, of the same cushioning material as the band, positioned on the inner surface of the band, extending upwardly of the cap portion, and adapted to engage the long tendon posterior of the cannon bone, therebetween, to prevent rotative displacement of the so mounted band and cap.

2. A protective leg support for horses as disclosed in claim 1, wherein the two spaced and parallel locating ribs are located centrally of the band and engage the long tendon anterior of the cannon bone, therebetween; in which position of the encircling body band, the cap portion covers and protects the coronet band, as well as the fetlock and the anterior pastern area.

3. A protective leg support for horses, as disclosed in claim 1, wherein the band of inherently cushioning material comprises a sheet of a sealed-cell polymeric composition of a thickness to provide adequate shock absorbing protection.

4. A protective leg support for horses, as described in claim 1, wherein the interengaging means comprises an elastic strap glued across the outer face of the leg encircling band with one end extending beyond the edge of the band for overlapping engagement with itself; outwardly directed first raised pile means secured to the outer face of the leg encircling band strap, intermediate its ends; inwardly directed, second raised pile means secured to the inner face of the strap at its free end; said first and second raised pile means adapted to be interengaged to releasably secure the end of the strap upon itself to anchor the leg encircling band in place.

References Cited by the Examiner

UNITED STATES PATENTS

| 126,479 | 5/72 | Koch et al. | 54—82 |
| 482,041 | 9/92 | Hurd | 54—82 |
| 1,479,000 | 1/24 | Keller | 54—82 |
| 1,885,394 | 11/32 | Walton | 66—187 |
| 2,194,921 | 3/40 | Wagner | 54—82 |
| 2,449,410 | 9/48 | Polinsky | 54—82 |
| 2,560,712 | 7/51 | Bell | 128—165 X |
| 3,074,405 | 1/63 | Duensing | 128—165 X |
| 3,160,143 | 12/64 | Gray | 119—96 |

SAMUEL KOREN, *Primary Examiner.*

ALDRICH F. MEDBERY, *Examiner.*